United States Patent [19]

Ito et al.

[11] 4,450,611
[45] May 29, 1984

[54] METHOD OF MANUFACTURING A BLADE WHEEL

[75] Inventors: Hiroshi Ito, Kawagoe; Toshihiko Yoshio, Hidaka; Masao Nagashima, Kawagoe, all of Japan

[73] Assignee: Honda Giken Kogyo Kabushiki Kaisha, Tokyo, Japan

[21] Appl. No.: 325,015

[22] Filed: Nov. 25, 1981

[30] Foreign Application Priority Data

Aug. 21, 1980 [JP] Japan .................. 55-113969

[51] Int. Cl.³ .................. B23P 15/04; B23K 31/02
[52] U.S. Cl. .................. 29/156.8 FC; 228/182; 228/187; 228/212; 219/158
[58] Field of Search ............. 29/156.8 FC, 156.8 CF, 29/23.5; 416/180; 219/158, 161, 127; 228/182, 187, 212

[56] References Cited

U.S. PATENT DOCUMENTS

| 1,868,146 | 7/1932 | Kiep | 29/156.8 FC |
|---|---|---|---|
| 2,256,988 | 9/1941 | Michailoff | 416/180 |
| 2,473,185 | 6/1949 | Weiss | 29/156.8 FC |
| 2,599,461 | 6/1952 | Koskinen . | |
| 2,779,292 | 1/1957 | Zeidler . | |
| 2,890,661 | 6/1959 | Egbert | 29/156.8 FC |
| 3,137,915 | 6/1964 | Smirl | 29/156.8 FC |
| 3,673,659 | 7/1972 | Ishii et al. | 416/180 |

FOREIGN PATENT DOCUMENTS 52-19863 2/1977 Japan .................. 29/156.8 FC

*Primary Examiner*—Daniel C. Crane
*Attorney, Agent, or Firm*—Armstrong, Nikaido, Marmelstein & Kubovcik

[57] ABSTRACT

Method of manufacturing a blade wheel including setting a plurality of blades into a first jig, positioning an annular core member thereover with mating projections on the blades with slits on the core member, welding at the mating points, setting the sub-assembly thus produced onto a shell member held in another jig with claw members of the blades engaging peripherally located slots in the shell member, and securing the two together with an annular retainer member with grooves engaging other claw members on the blades being spot welded to the shell member.

5 Claims, 7 Drawing Figures

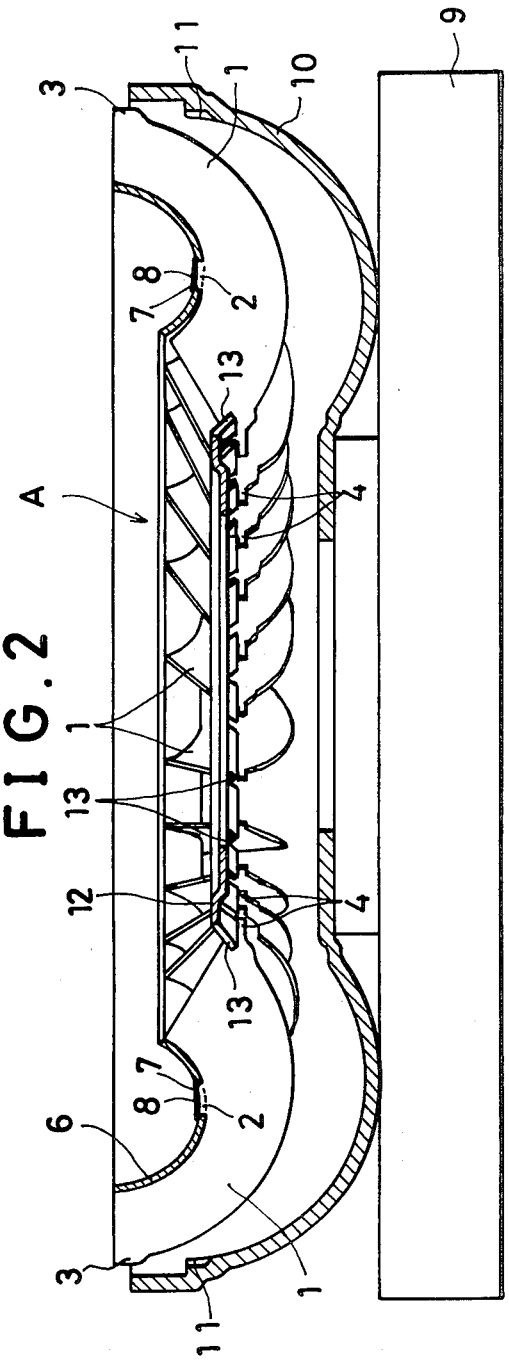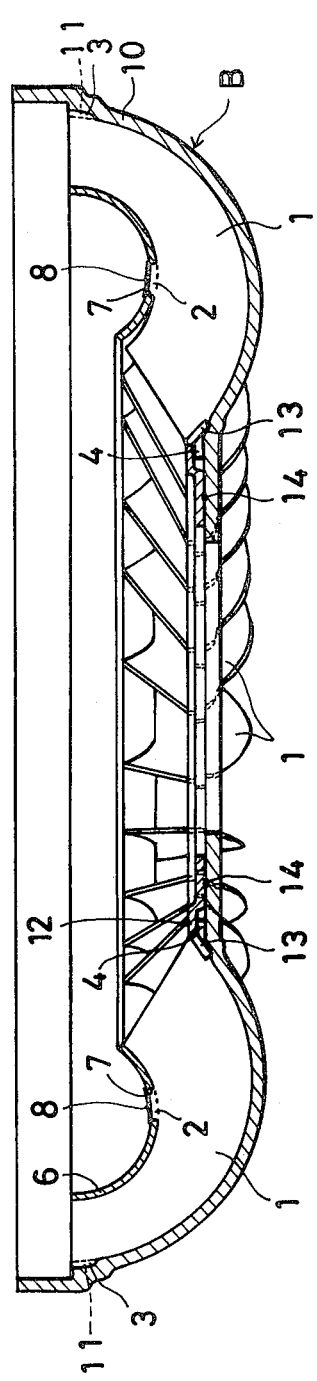

METHOD OF MANUFACTURING A BLADE WHEEL

BACKGROUND OF THE INVENTION

This invention relates to a manufacturing process of a blade wheel, which can be applied chiefly to the manufacturing of a turbine wheel or a pump wheel for a torque converter.

A conventional manufacturing process of this kind usually interposes a number of blades between a core member disposed on one side thereof and a shell member disposed on the other side thereof. The blades are then secured to those members at their respective end portions. This process is, however, disadvantageous in that the setting of the respective blades into position requires much trouble and the manufacturing work becomes troublesome.

OBJECTS AND SUMMARY OF THE INVENTION

This invention has for an object the provision of a manufacturing process free from the above inconvenience, and it is characterized in setting a number of blades on a setting jig, placing a core member on the blades and securing the core member to the blades by MIG welding or the like, thereby fabricating a sub-assembly and, thereafter, placing the sub-assembly on a shell member set on another setting jig and securing the sub-assembly at its respective blades to the shell member. It is desirable in this case that the securing work between the shell member and the respective blades of the sub-assembly be made simple and easy.

This invention has for another object the provision of a manufacturing process meeting this desire, and it is characterized in that an annular retainer member, which is provided at its outer circumferential portion with respective engaging grooves for engagement with respective base shoulder portions of claw members extending from inner end portions of the respective blades and at its inner circumferential portion with respective receiving surfaces for pushing the respective claw members from above, is placed on the shell member and is secured thereto by spot welding or the like.

BRIEF DESCRIPTION OF THE DRAWINGS

FIG. 2 is a sectional side view showing a second step for obtaining an entire assembly;

FIG. 3 is a sectional side view of the entire assembly;

DETAILED DESCRIPTION OF THE INVENTION

Figure 1:
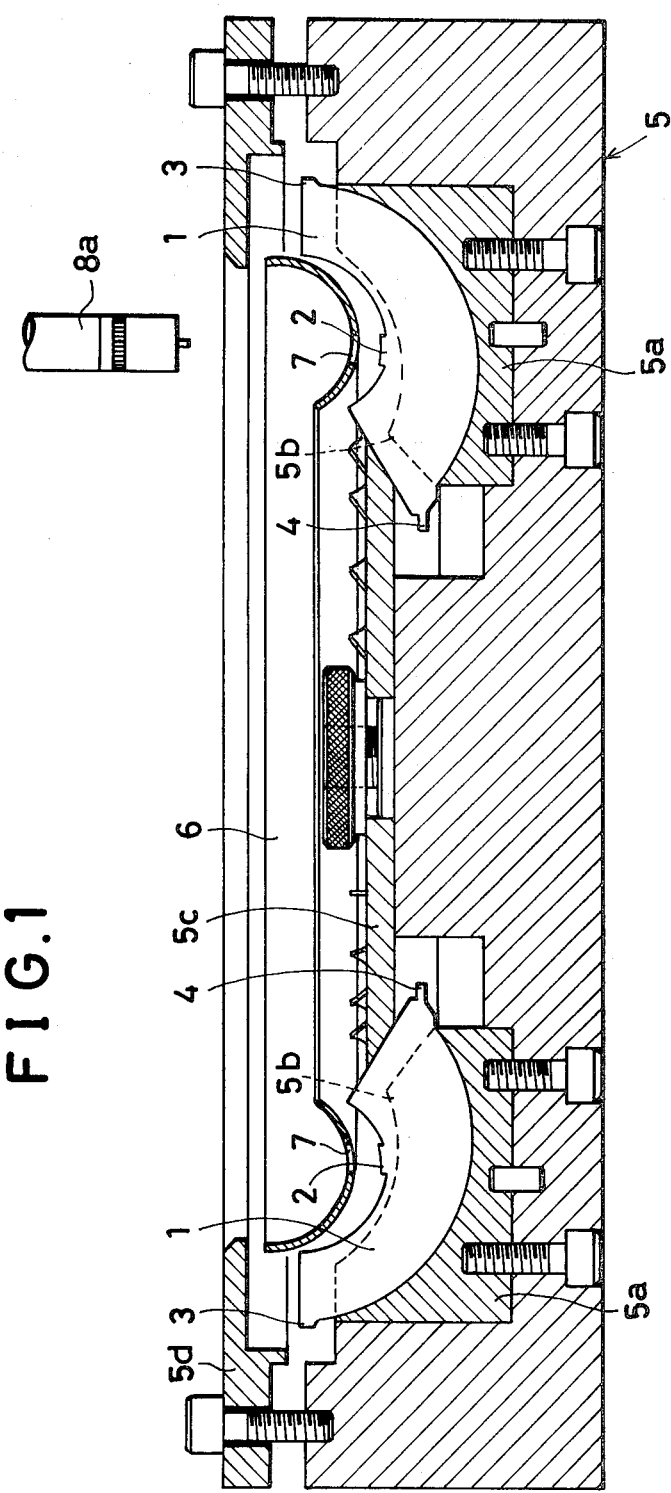
FIG. 1 is a sectional side view showing a first step for obtaining a sub-assembly according to the present invention.

Embodying examples of the invention will now be explained with reference to the accompanying drawings:

Referring to the drawings, a metallic sheet-made blade 1 is provided at its middle portion of one concave-curved side edge thereof with a projection 2 and at both end portions of its other convex-curved side edge thereof with a pair of claw members 3,4. The blade 1 is set on a first setting jig 5. As shown in FIG. 1, a necessary number of the blades 1 are arranged on the jig 5 radially and at regular intervals. An annular metallic sheet-made core member 6 having a concave inner surface and a convex outer surface is put on the blades 1 as shown in the Figure. The convex outer surface matches the curves of first-mentioned side edges of the blades 1. The core member 6 is previously provided at its middle portion with a number of slits 7 and is mounted with the respective slits 7 on the respective projections 2 of the blades 1. Thus, the core member 6 and the blades 1 are held in position with one another. The respective mutually mounting portions, namely the projection 2 extending into the slits 7, are welded with MIG welding 8 by a welding torch 8a from above. This unit is hereinafter titled a "semi-assembly A" or a "sub-assembly".

The setting jig 5 comprises a metallic jig base 5a having a number of setting grooves 5b, a first pushing member 5c for pressing down the blades 1 and a second pushing member 5d for pressing down the core member 6.

In the next step as shown in FIG. 2, the sub-assembly is placed on a metallic sheet-made shell member 10 previously set on another setting jig 9. The shell member 10 is previously provided on its outer circumferential portion with a number of slots 11. The sub-assembly A is mounted with the respective claw members 3 of the respective blades 1 sliding into and resting in the respective slots 11. Thus, the shell member 10 and the blades 1 are held in predetermined position with respect to each other.

Figure 4:
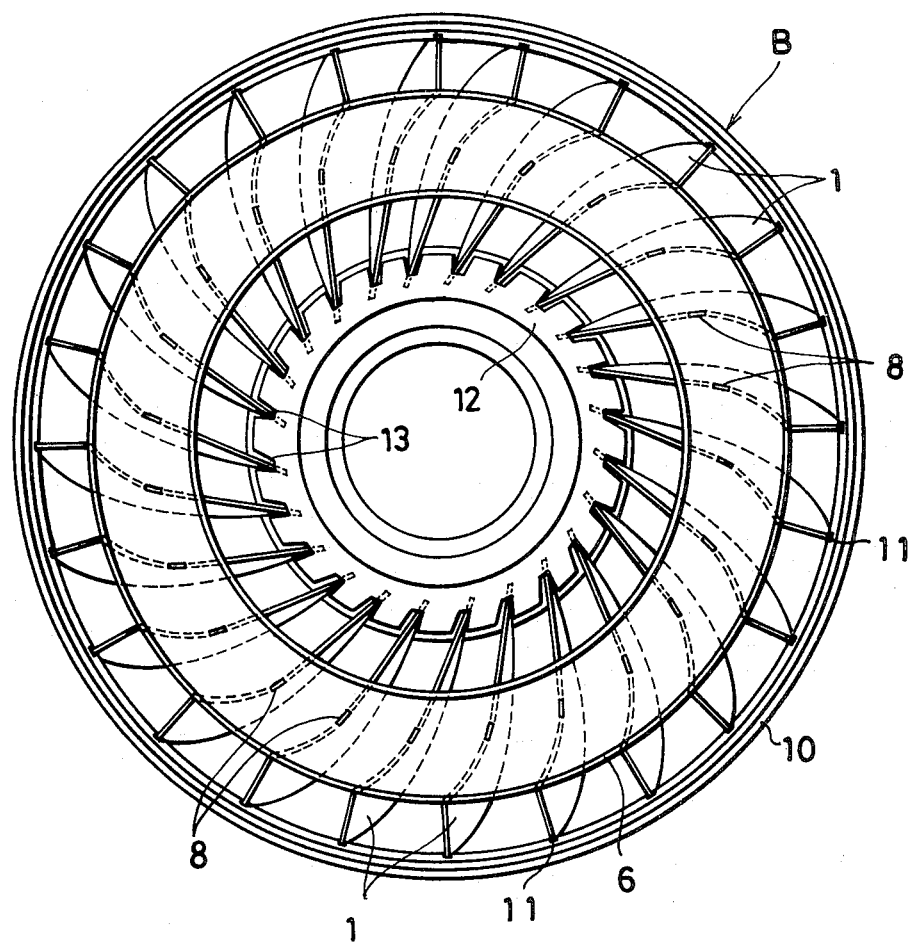
FIG. 4 is a top plan view of the entire assembly.

Separately, a metallic sheet-made annular retainer member 12 is prepared and the same is provided at its outer circumferential portion with respective engaging grooves 13. The member 12 thus prepared is mounted with the respective grooves 13 engaging the respective claw members 4 of the other end portions of the respective blades 1. The retainer member 12 is then fixed to the shell member 10 by spot welding 14 or the like. Thus there is established an entire assembly B as shown in FIGS. 3 and 4. The assembly B is thereafter subjected to a soldering treatment and all the component parts thereof are connected together integrally to form the final product.

Figure 7:
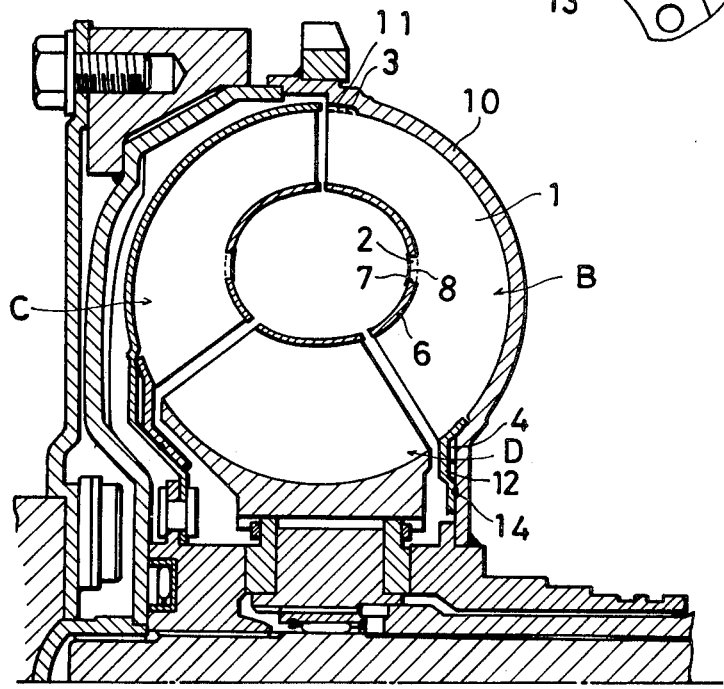
FIG. 7 is a sectional side view of a torque converter showing one example of the usage of the product.

FIG. 7 shows one example of a torque converter wherein the product manufactured by this invention is used as a pump wheel. In this Figure, C denotes a turbine wheel and D denotes a stator wheel. The turbine wheel C may also be obtained in almost the same process as above.

Figure 5:
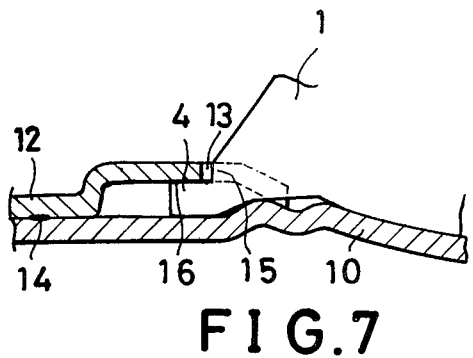
FIG. 5 is an enlarged sectional front view of a retainer member portion thereof.

The foregoing retainer member 12 will be explained more in detail as follows:

Namely, as shown clearly in FIGS. 4 and 5, the retainer member 12 is provided at its outer peripheral portion with the respective U-shaped engaging grooves 13 for engagement with shoulder portions 15 formed on base portions of the respective claw members 4 extending from the inner end portions of the respective blades 1. The retainer member 12 is provided, at its inner peripheral portions radially inside the respective grooves 13, with respective receiving surface portions 16 for pressing down the respective claw members 4. Thus, if the retainer member 12 is placed on the shell member 10, the respective blades 1 are guided at the inner end portions by the respective grooves 13 for being held in their respective predetermined angular positions and, at the same time, are held at the respective claw members between the shell member 10 and the respective receiving surfaces 16. From this condition, the retainer member 12 is fixed to the shell member 10 by the spot welding 14.

Figure 6:
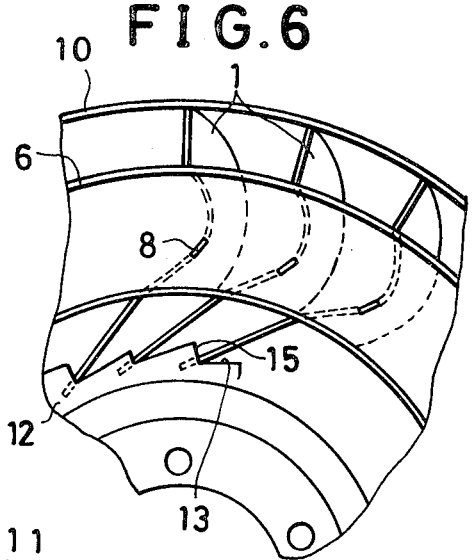
FIG. 6 is a top plan view of a portion of the assembly in a modified example.

The engaging grooves 13 may be so modified in a V-form as shown in FIG. 6.

Thus, according to this invention, a number of blades are first set on a setting jig and, under this condition, are assembled with a core member so that the blades can be set in position by the jig and the semi-assembling work can be simplified. Next, the resultant sub-assembly is further placed on a shell member previously set on another jig so that a complete assembling work can also be simplified. Thus, the entire assembly work can be simple and reliable and an excellent product can be obtained economically. Further, according to another feature of this invention, a retainer member serves to guide the base end shoulder portions of claw members extending from inner ends of the respective blades so as to set the respective blades in their respective predetermined positions and serves also to hold the claw members so as to fix the respective blades so that the work of setting and fixing a number of blades can be carried out simply and economically.

What is claimed is:

1. Method of manufacturing a blade wheel comprising the steps of:

placing and holding a plurality of blades in first jig means for holding the blades in predetermined circumferentially spaced apart positions at predetermined angles, each of said blades having a projection on a concave-curved side edge thereof and claw members extending from opposite end portions of a convex-curved side edge thereof, said projections extending upwardly relative to said first jig means;

positioning an annular core member having a convex outer surface matching said concave-curved sides edges of said blades and a plurality of slits corresponding in number and position with said projections onto said blades in said first jig means with said projections engaging said slits;

securing said core member to each of said blades by welding at each of the positions where said projections extend into said slits, thereby forming a subassembly;

placing and holding a shell member in second jig means for holding the shell member in a predetermined position, said shell member having a concave inner surface matching said convex-curved side edges of said blades and a plurality of slots corresponding in number and position with the radially outermost claw members of said blades;

removing said subassembly from said first jig means and positioning said sub-assembly into said shell member in said second jig means with said radially outermost claw members sliding into and resting in said slots;

securing said sub-assembly to said shell member, thereby producing an entire assembly.

2. The method as claimed in claim 1 wherein the step of securing the sub-assembly to the shell member comprises:

positioning an annular retainer member over the radially innermost claw members of said blades, said annular retainer member having a plurality of grooves in its inner circumferential periphery corresponding in number and position with the radially innermost claw members of said blades;

securing said retainer member to said shell member by welding at selected positions, thereby securing said sub-assembly to said shell member.

3. The method as claimed in claim 2 wherein the step of securing the sub-assembly to the shell member further comprises, after securing the retainer assembly to the shell member, subjecting the entire assembly to a soldering treatment to produce an integral final product.

4. The method as claimed in any one of claims 1, 2 or 3 wherein the welding of the blades and the core member is by MIG welding.

5. The method as claimed in any one of claims 2 or 3 wherein the welding of the retainer member to the shell member is done by spot welding.

* * * * *